(12) United States Patent
Juneja et al.

(10) Patent No.: US 10,521,464 B2
(45) Date of Patent: Dec. 31, 2019

(54) METHOD AND SYSTEM FOR EXTRACTING, VERIFYING AND CATALOGING TECHNICAL INFORMATION FROM UNSTRUCTURED DOCUMENTS

(71) Applicant: Agile Data Decisions LLC, Houston, TX (US)

(72) Inventors: Amit Juneja, Pearland, TX (US); Jacques Micaelli, Houston, TX (US); Joe Johnston, Guiseley (GB)

(73) Assignee: AGILE DATA DECISIONS, LLC, Houston, TX (US)

( * ) Notice: Subject to any disclaimer, the term of this patent is extended or adjusted under 35 U.S.C. 154(b) by 240 days.

(21) Appl. No.: 15/375,079

(22) Filed: Dec. 9, 2016

(65) Prior Publication Data

US 2017/0169103 A1 Jun. 15, 2017

Related U.S. Application Data

(60) Provisional application No. 62/265,451, filed on Dec. 10, 2015.

(51) Int. Cl.
*G06F 17/30* (2006.01)
*G06F 16/33* (2019.01)
(Continued)

(52) U.S. Cl.
CPC ........ *G06F 16/3346* (2019.01); *G06F 16/254* (2019.01); *G06F 16/313* (2019.01); *G06F 16/93* (2019.01); *G06N 20/00* (2019.01); *G06F 16/258* (2019.01); *G06F 16/26* (2019.01); *G06F 16/30* (2019.01); *G06F 16/951* (2019.01)

(58) Field of Classification Search
CPC ......... G06F 17/30569; G06F 17/30563; G06F 17/30011; G06F 17/30864; G06F 17/30675; G06F 17/30705; G06F 17/30707; G06F 17/30303; G06F 17/30598; G06F 16/258;
(Continued)

(56) References Cited

U.S. PATENT DOCUMENTS 9,384,264 B1 * 7/2016 Kavas ................ G06K 9/00469
2007/0011134 A1 * 1/2007 Langseth .......... G06F 17/30563
(Continued)

*Primary Examiner* — Dangelino N Gortayo

(57) ABSTRACT

Information extraction methods for use in extracting values from unstructured documents for predetermined or user-specified attributes into structured databases are provided herein. Methods include (a) automatically training machine learning models for extracting values from unstructured documents such that the values of the attributes are known for those training documents but the locations of the values in the documents are not known, (b) making a sustained connection between structured databases and unstructured documents so that the data across those two types of data stores can be cross-referred by the users any time, (c) a graphical interface specialized for rich user feedback to rapidly adapt and improve the machine learning models. The methods allow businesses and other entities or institutions to apply their domain knowledge to train software for extracting information from their documents so that the software becomes customized to those documents both from initial training as well as continuing user feedback.

4 Claims, 6 Drawing Sheets

(51) Int. Cl.
*G06N 20/00* (2019.01)
*G06F 16/93* (2019.01)
*G06F 16/25* (2019.01)
*G06F 16/31* (2019.01)
*G06F 16/26* (2019.01)
*G06F 16/951* (2019.01)
*G06F 16/30* (2019.01)

(58) Field of Classification Search
CPC ...... G06F 16/254; G06F 16/93; G06F 16/951; G06F 16/26; G06F 16/30
USPC ....... 707/740, 748, 602, 723, 729, 730, 737, 707/758, 750
See application file for complete search history.

(56) References Cited

U.S. PATENT DOCUMENTS

2009/0125529 A1* 5/2009 Vydiswaran ...... G06F 17/30569
2016/0041992 A1* 2/2016 Miyata ................ G06F 17/3061 707/740
2016/0321358 A1* 11/2016 Kanani ................ G06F 17/277
2017/0091313 A1* 3/2017 Chalabi ................ G06N 20/00
2017/0161637 A1* 6/2017 Misra .................... G06F 16/313
2017/0371958 A1* 12/2017 Ganjam ................ G06N 7/005

* cited by examiner

FIG 3

Well: XYZ-1

Latitude:
53 deg 31 min 20.324 sec — 16

Longitude:
01 deg 33 min 0.0042 sec

METHOD AND SYSTEM FOR EXTRACTING, VERIFYING AND CATALOGING TECHNICAL INFORMATION FROM UNSTRUCTURED DOCUMENTS

BACKGROUND OF THE INVENTION

Field of the Invention

The present invention generally relates to extraction of information from unstructured or natural language documents such as reports, logs, etc. Businesses accumulate large numbers of unstructured documents over years or decades in diverse formats and file types. Tedious human effort is required to review and extract information from documents, categorize documents into different classes for ease of access, verify consistency of information across multiple data sources and documents, and to check the accuracy of data against industry rules and standards. The extensive human labor required for these tasks lowers the efficiency and productivity and diverts human effort away from more productive, challenging and creative tasks. Yet, each business's documents may be different from other businesses and a software or system to extract information from the documents must customize itself to those documents. Moreover, if users are provided methods to apply their domain knowledge to customize an information extraction system that could lead to more accurate system for the users' needs.

Additionally, many, if not all, companies and other institutions or individuals have extensive databases as well as documents such that the information in the databases and the documents is expected to match or be consistent with each other simply because either the information was entered manually from the documents or because the documents and the databases were created from the same source. Yet there can be significant discrepancies between documents and databases, or between the documents, because of either human error or because the databases and the documents may have been updated at different times, from wrong sources, or inconsistently from each other. By extracting information from documents and presenting it to the user in conjunction with the information in the existing database the invention described in this disclosure can highlight the discrepancies to a user who can then fix errors to improve the accuracy of the database. The invention includes graphical software that maintains active and user-modifiable links between the documents and databases such the source of the information in the database can be pointed to by the interface any time at user's request.

DESCRIPTIONS OF TERMS

Text string: Any sequence of characters including letters, numbers and special characters is referred to as a "text string" in this disclosure.

Attributes and values: An attribute is a field such as a zip code, a city name, a latitude, etc. and a value is the text string that is an entry for that attribute, for example, 77581 is a value of the attribute zip code and "10 Dec. 2015" is a value of an attribute "birth date".

Information: The term "information" is used in this disclosure to describe values of user defined attributes.

Metadata: A set of attributes and their values are referred to as metadata in this document.

Unstructured documents: Images, PDFs, web pages, plain text files and other electronic files where metadata does not appear in a pre-defined format are defined as unstructured documents. Unstructured documents also include structured documents from which text can be read but the structure of the text is unknown.

Database: The term "database" used broadly in this discloser to refer to structured data stores such as spreadsheets, relational databases as well as NoSQL databases.

Score or "confidence score": The terms score and confidence score are used interchangeably in this disclosure to denote a number, typically between a certain range such as zero to 100, that is expected to be higher when a text string is more likely to be the value for an attribute than when it is less likely to be a candidate. Scores are computed in this invention either by a spatial scoring procedure explained in detail below or by the output of machine learning methods.

DESCRIPTION OF THE PRIOR ART

Approaches exist for extracting attribute-value pairs from semi-structured text (U.S. Pat. No. 7,769,579B2) where the HTML or similar structure is used to find attributes and values in documents.

Approaches exist for extracting information using symbolic machine learning based on existence of language that indicates relations between text strings that represent attributes and values (US Patent US20060009966A1).

Approaches have been reported for answering user questions using text in unstructured data (U.S. Pat. No. 9,110,882 B2)

There are existing methods that apply machine learning to extract information from documents into databases (U.S. Pat. No. 7,930,322B2)

There are existing methods that apply statistics of occurrence of items for extracting information and creating database schema from the extracted information (U.S. Pat. No. 7,930,322B2)

There are existing methods that apply grammar dependency rules to learn the extraction of attributes and values (US patent US20050086222A1)

Support vector machines and word frequency transforms are used in some methods to extract values of attributes and connect the documents to databases (US20060282442A1)

There are methods that use N-gram statistics from surrounding words to extract values (US2016041987 (A1))

There are methods that apply deep learning for character based information extraction ("Deep Learning for Character-Based Information Extraction", Yanjun Qi, Sujatha G. Das, Ronan Collobert, Jason Weston, Advances in Information Retrieval, pages 668-674).

Information extraction methods have been developed to extract tabular data (US patent US20140369602A1)

The present invention focuses on enabling users to train information extraction software or system by providing their documents, specifying the attributes whose values they would like to extract, and performing certain actions from their domain knowledge to steer the training of machine learning models for information extraction in the right direction. Users apply their domain knowledge, as detailed further below, by providing "helper words" for each attribute and by providing feedback using a rich interface that is used to improve the machine learning models. No structure is assumed to be present in the documents, for example, attributes and values are not assumed to be present in a tabular structure or even in a grammatical sentence. Instead of applying word frequency-based or grammar-based features in machine learning the present invention relies on features computed from exact locations of characters in the spatial neighborhood of a set of candidate text strings one of which may represent the information to be extracted.

SUMMARY OF THE INVENTION

The present invention pertains to customization of information extraction software by users for their domain specific documents or any other documents that they are interested in extracting information from. "Information", as referred to in this disclosure includes metadata or numeric or textual values of user defined attributes. The users can customize the software by providing documents and related metadata, and then the documents and the metadata are applied to train machine learning models that can then automatically extract information from new documents. The user does not have to supply the locations, for example, page numbers and coordinates, in the documents where the metadata exists. The invention pertains to how initial models can be built using (a) the documents supplied by the user, (b) the metadata supplied by the user for each document and (c) additional information supplied by the user, and to how these models can be improved by gathering and applying rich feedback from the user.

In one embodiment of the invention a set of documents and accompanying metadata are supplied by the user to the software, and then the software computes or trains an initial set of machine learning models without any direct knowledge of the locations of the metadata in the documents. In addition to specifying the attributes the user also supplies the values of those attributes which are likely to appear each of several subsets of the documents, as well as a set of text strings related to the attributes that are likely to appear in the spatial neighborhood of the values of those attributes in the documents. Such text strings that may include words, phrases and special characters are referred to as "helper words" in this disclosure. For each value, zero or greater number of text string candidates may be found in each of the documents using certain criteria supplied by the user. The candidates are then given a score depending on the spatial closeness of the candidates to the helper words by a procedure referred to in this disclosure as "spatial scoring procedure". The scores computed from spatial closeness are henceforth referred to as "spatial scores. The scores then become training labels for training regression or ranking models, for example, support vector machine based regression or ranking. The features for training the regression models are computed as highly sparse vectors from a window of characters around each candidate string. The regression models are thus trained such that they are expected to provide a high hypothesized score for text strings that are more likely to be the value of an attribute and a low hypothesized score for text strings that are less likely to be the value of the attribute.

One embodiment of the invention is to process the documents submitted by the user to a trained system in a processing pipeline on a distributed computing architecture. Each document is processed in a pipeline where operations including optical character recognition and extraction of values of each attribute using the trained regression model is done in a single pipeline running on a single core of a distributed computing system. The information from multiple documents is then merged in an "entity-aware" merging process. An entity is one of the attributes selected by the user such that information from the documents that have the same extracted value of the entity is merged together. The merged information then becomes the information for that entity. The documents are then displayed to the user clubbed together by entity values. The extraction values for each attribute other than the entity are displayed to the user ranked from highest confidence level to the lowest confidence level, where the confidence levels are obtained from the output of the trained regression models. A rich interface is provided to the user where the user may carry out several feedback actions such as validating, deleting and reranking values of each attribute. Additional operations such as classifying documents using machine learning may be done in the document processing pipeline.

One embodiment of the invention is a system to bridge the gap between unstructured data and structured data sources such as relational databases. The unstructured data and structured data stores frequently exist in isolation and yet contain extensive amounts of overlapping information. The system included in this invention can be applied by a user to apply machine learning models to a set of documents that possibly contain metadata that already exists in a database. The user may view the values extracted from the information extraction process using the display and feedback interface included in this invention to see how the extracted values compare with the values that already exist in the database. The values that are given a high confidence level by the system for each attribute may be highlighted to the user if they differ from the values that were already existing in the database for that attribute.

BRIEF DESCRIPTION OF DRAWINGS

The following drawing are included in this disclosure:

FIG. 3 shows an example of a context window around a candidate string, and how highly sparse features are extracted from the context window to get the input for machine learning models.

DETAILED DESCRIPTION OF THE INVENTION

Figure 1:
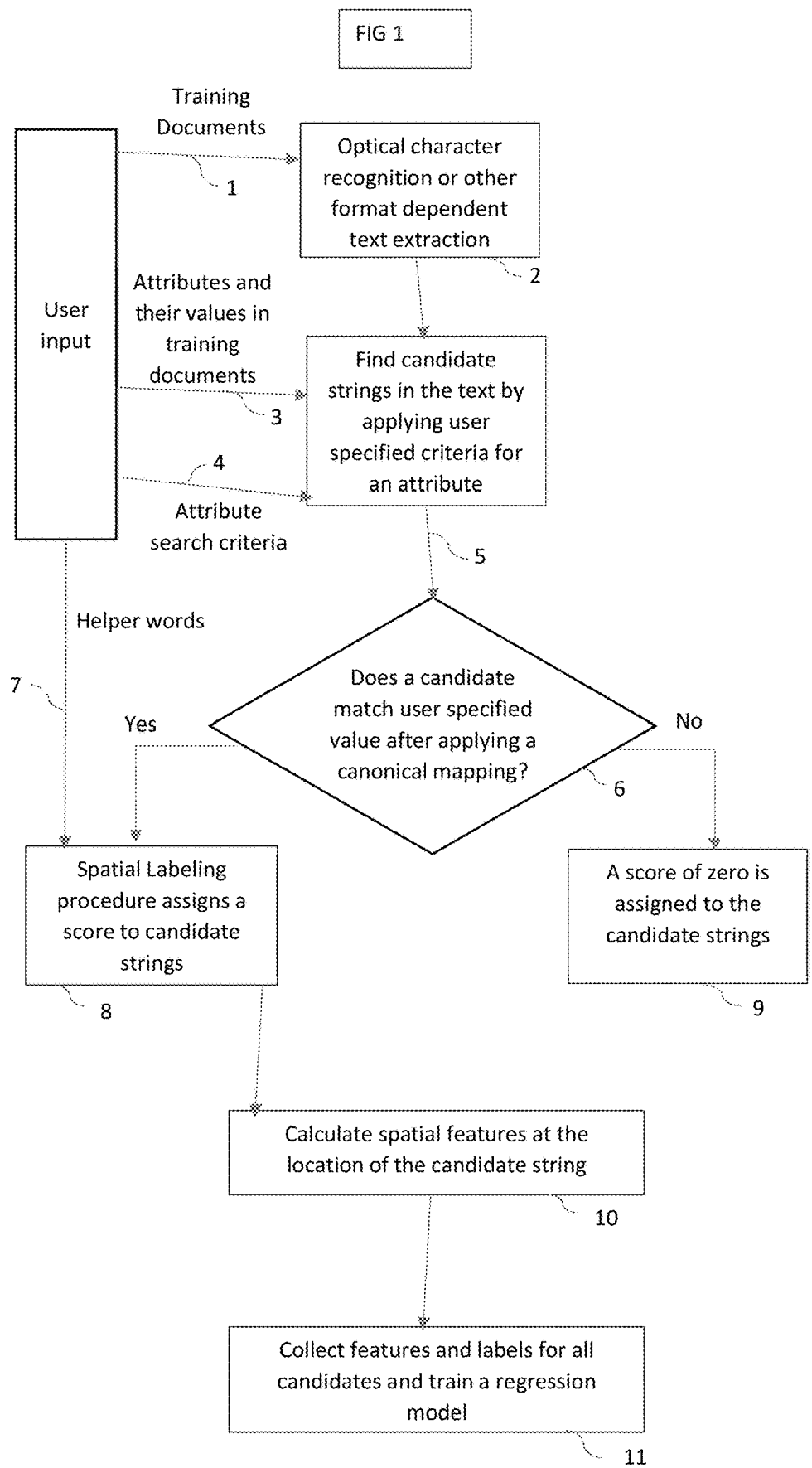
FIG. 1 shows the schematic of the training process that takes in user input in the form of documents, attributes and values for those documents, helper words from users' domain knowledge, attribute search criteria, and generates trained machine learning models.

FIG. 1 shows the schematic of the system training process. This process takes as input a limited number of documents 1 along with accompanying pieces of information 3 that have been extracted already by a human expert. The information already available to the users or "reference information" can be of any form such as spreadsheets, relational databases or plain text files such that attribute value pairs of information can be obtained from these sources of information. For example, reference information could contain for an oil well document the name of the oil well the document is associated with, latitudes and longitudes of the well, etc. In these cases the "well name" is the attribute and the string containing the name of the well is the value of the attribute. Similarly, "latitude" is the attribute and the value is actual latitude coordinates expressed in degrees, minutes and seconds. The user may not provide locations—page number, coordinates, etc.—where value of the attribute was extracted from. The documents are run through an optical character recognition system or another document processing step 2 to convert the document to text.

A spatial scoring procedure is applied in the situation where the user has supplied reference information or metadata in the form of attribute-value pairs but has not indicated the locations in the documents where the information exists. For example, the user may have supplied for a set of documents related to an oil well and the values of the latitude and longitude for the well but the user may not have supply the location of the values in the documents that conveyed that information. The spatial scoring procedure is a three-step process described in further detail below (a) Text candidate selection on the basis of certain user-specified criteria, (b) Shortlisting of candidates that match to the user supplied value after mapping to a canonical form, (c) Assigning a score or to each of the shortlisted candidates.

The text candidate selection procedure 5 selects various portions of the text that could possibly represent the information. Following the example of latitudes and longitudes, the algorithm would then select parts of text in the document that could possibly be latitudes and longitudes. Users may specify criteria 4 that values for each attribute may satisfy. For example, a US zip code may be specified to be a five-digit number. The candidate selection part of the spatial labeling procedure finds all the strings in a document that satisfy the criteria for each attribute. For example, all five digit numbers may be candidates for US zip codes. The criteria may be specified in many ways such as integers or floating point values in a certain range, or user defined regular expressions for date, time and other text strings that may allow to be specified by regular expressions, etc. It should be noted that not all text string candidates would match the actual human extracted textual information which is why the canonical mapping step described next is required. The specification of the text selection criteria allows the users a way to use their domain knowledge to help customize the training process.

The spatial scoring procedure applies a canonical mapping to the following two types of values (1) the values provided by the user for an attribute, and (2) the candidate text strings found by the candidate selection process. This allows the two types of values to be compared to each other 6. For example, the spud date of an oil well may appear in a document as "September 1, 2011" whereas in the reference values supplied by the user it may appear as "09/01/2011". The canonical mapping procedure then maps both of these dates to a standard internal representation in which equality can be checked. The candidates selected by the candidate selection process are compared to the user supplied values and the candidates that match are shortlisted for assigning them "spatial scores". The candidates that do not match the user specified values 9 are assigned a spatial score of zero.

The system then applies the helper strings 7 supplied by the user and assigns confidence scores called "spatial scores" 8 to each of the shortlisted matches of text strings. The parts of document text that are shortlisted by the previous steps are each scored by calculating an estimate of the validity of those text strings as representative of the human extracted information. The spatial score of a text string for an attribute is computed as:

1) The spatial closeness of the text string to the name of the attribute, for example, the number "53" gets a higher score if it appears closer to the word "Latitude Degrees", plus
2) The sum of spatial closeness of the text string to any of the "helper strings" specified by the user. For example, a number 53 gets a higher score for attribute "Latitude seconds" if it is closer to a user specified helper string such as "Lat" or the symbol for seconds".

Figure 2:
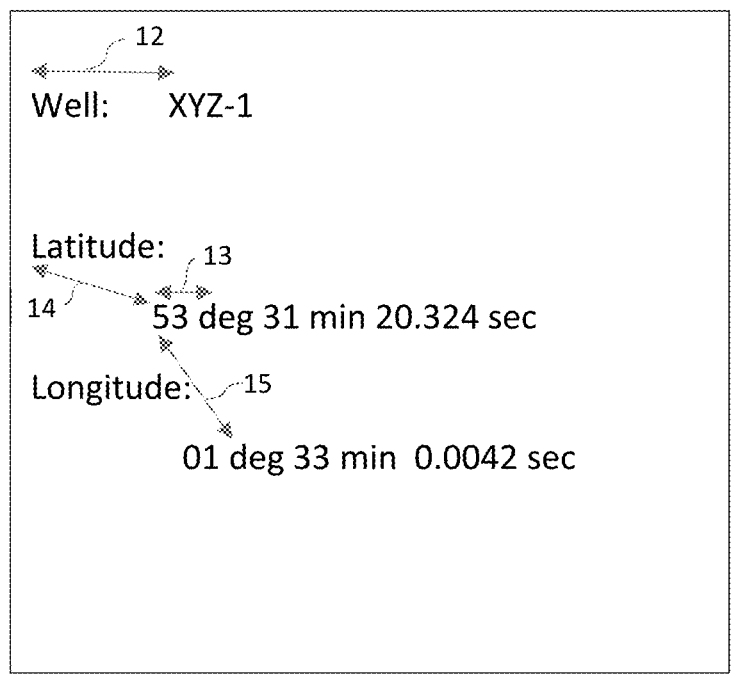
FIG. 2 shows examples of Euclidean distances of values of attributes to the helper words specified by the user for each attribute.

The spatial closeness is computed as the inverse of the Euclidean distance of the candidate string to the attribute or the helper string in the document. Two examples of Euclidean distance are shown in FIG. 2. The distance for a well name "XYZ-1" is shown 12 to the helper word "well". The distances of a latitude degree "53" to the helper words "deg" and "Latitude" are shown 13, 14, 15. The distance is measured in number of characters or in pixels.

To complete the training process, the shortlisted candidate strings and their spatial scores are applied to train a machine learning system, particularly a regression system. The labels for the training of regression are the spatial scores of the candidate strings and the input features for training the regression system are computed from a fixed window of spatial context centered around each candidate string. An example of spatial context 16 is shown in FIG. 3. The spatial context of a string could include, for example, a certain number of lines above the string, a certain number of lines below the string, a certain number of characters to the left of the string and a certain number of characters to the right of the string. To compute the numerical features for the candidate string, each of the characters is mapped to a code such as an ASCII code, and then a vector is created for that character that takes the value one for the code of the character and the value zero for all of the other possible codes. For, example, for an 8-bit ASCII code, each character will map to a vector of size 256 that is zero in each dimension and one in the dimension represented by the ASCII code of that character. A highly sparse vector is hence generated for each character, and then all of the vectors for the characters in the spatial context are concatenated to build the feature vector for the candidate string. Additional features are appended to the concatenated sparse vector including font sizes of the characters, bold/italic or underline property of the characters, page number, relative position within the page—top, left, center, etc. to get the feature vector that is ready to be used for building a regression model. A regression or ranking model is then trained using one of the standard machine learning methods that can take as input sparse data such as support vector machines. The machine learning model trained by this method is targeted as producing a higher output value (or higher rank for ranking model) for a candidate string that is more likely to be the value for an attribute than a candidate that is less likely to be the candidate. A separate machine learning model is built for each attribute.

Figure 4:
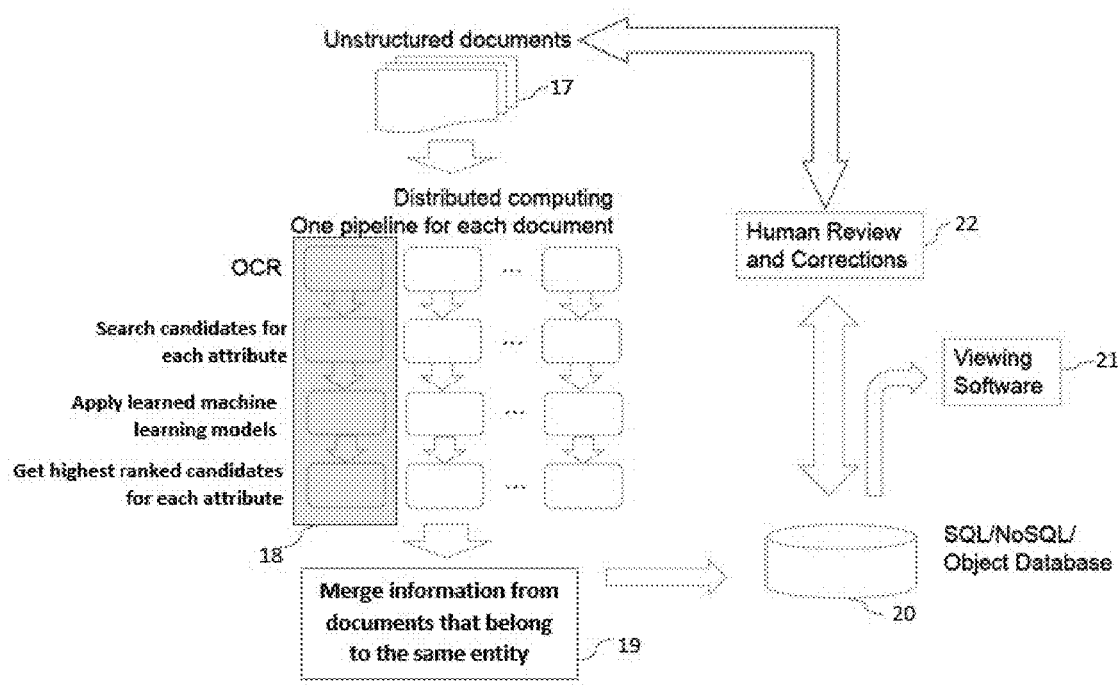
FIG. 4 shows a pipeline architecture used to process documents supplied by a user using distributed computing, such that several operations on a document are done in a separate pipeline and the extracted information is merged depending on the extraction of an entity value for each document.

To extract values of attributes from new unstructured documents supplied by a user the candidates of an attribute are selected using the user-defined criteria. The features are extracted from each candidate by computing the sparse vector and the additional features mentioned above in [016], and the output of regression model is computed for that attribute. The candidate that presents the highest regression output is hypothesized as the extracted candidate. FIG. 4.

shows an "entity-aware" pipeline architecture is used to process multiple documents 17 submitted by the user. Each pipeline 18 accepts one document and runs it through a series of operations such as optical character recognition (if needed), extraction of candidates for each attribute, apply machine learning for each candidate, find highest ranking candidates from machine learning output and other operations such as document categorization or classification.

In the second phase of the architecture when all the documents have been processed the information from multiple documents is merged 19. One of the attributes that is typically extracted is the entity name, for example, a "well name" for an oil well related document. The entity can be any one of the attributes selected by the user such that the user is interested in putting together the documents that have the same value extracted for the entity. For example, for documents containing patient medical records the entity may be designated as "patient name" in which case all the documents that have same value for the "patient name" are pulled together to display to the user and the information from those documents is merged. The merging process includes displaying to the user the value for each attribute as the value that has the highest confidence score across several values for the attribute extracted from multiple documents for the same entity. Further, in the case of multiple documents for the same entity when the extracted information is merged it becomes information for that entity rather than just for a document. Also as part of the merging process multiple values for the same attribute extracted from documents for the same entity are displayed to the user ranked by their confidence levels. The extracted values of attributes are written to a database such as a relational or a NoSQL database 20. The extracted values are presented to the user in a graphical user interface 21 where user can review the information and make corrections 22. The attribute values are written to the database in such a way that a user may query the database to surface values for a given document or for a given entity. In the case of an entity, the values from the merging process the surfaced to the user for that entity.

Figure 5:
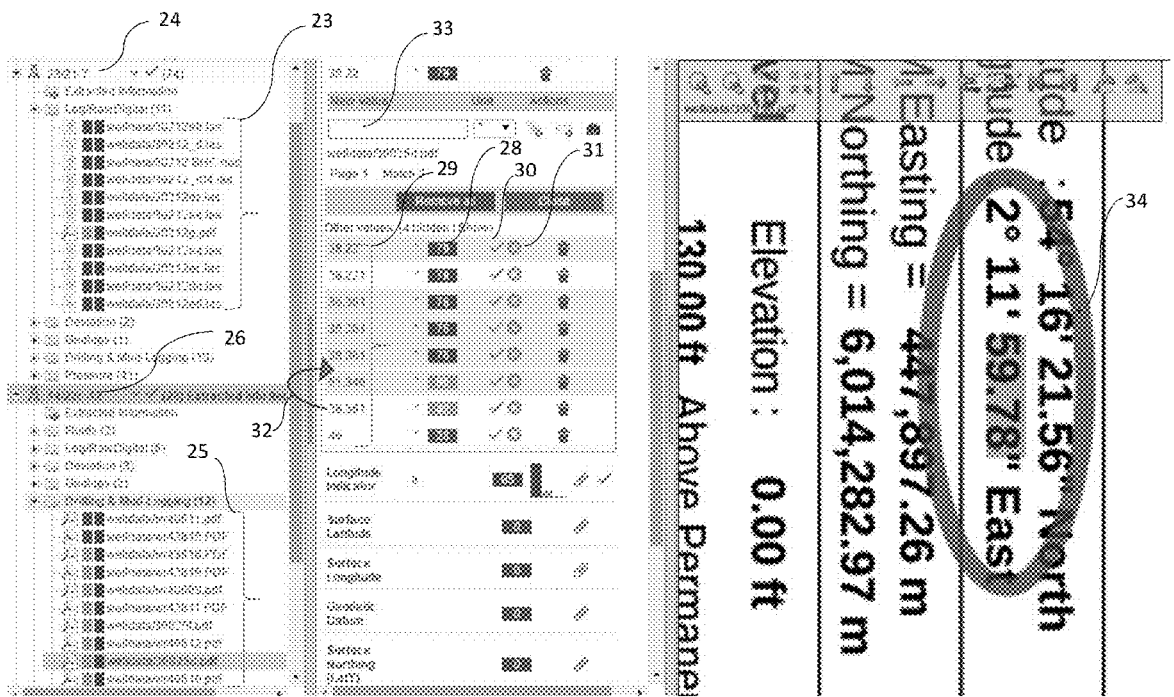
FIG. 5 shows a rich user interface where users can provide several kinds of feedback that can be used in improved training of the machine learning models for information extraction

Not only the extracted values of the attributes are stored in the database, the documents and the locations in the documents where the values were extracted from are also stored. The locations of the values are stored in two different ways:

1. Using page number and page occurrence of the value. Page occurrence is the instance of the text string that matches the value on the page, that is, one plus number of times the text strings identical to the value appears before extracted value on that page
2. Page number and the horizontal and vertical coordinates of the beginning of the value on the page. The coordinates do not apply to plain text documents or other types of documents that may not be described in pixels FIG. 5 shows a rich graphical interface that is presented to the user to expose the extracted information along with a display that shows where each value was extracted from. Documents that have the same value extracted for the entity attribute, "well name" in this example, are shown, that is, documents 23 are assigned to entity value "23/21-7" at 24 and documents 25 with are assigned to entity value "44/22c-12" at 26. The confidence scores obtained from regression are displayed to the user, for example, for attribute of "latitude seconds" at 28 and the candidates are shown ranked by the score 29. Several options are presented to the user to provide feedback: (a) the user can validate an entry 30, (b) the user can set a value as invalid 31, (c) the user can re-rank several values of an attribute extracted from the same or from different documents by dragging and dropping values within the list 32, (d) the user can specify a new location for the value in the document by selecting a portion of the text, and (e) the user can search and add a new value for the attribute in one or more documents 33. The value currently selected by the user is shown at 34 at the location where it was extracted from. The user actions are stored in the database so that it can then be used for improving the machine learning models. The user can also delete the attribute values from one or several documents. The deletion will avoid a particular extraction to be used to improve the learning model while "Invalidate" operation assigns the value a score of zero.

The system learns from human corrections and validations. When the user picks one alternative for an extracted piece of information over the one that was proposed by the machine learning process or point to another one somewhere in the document, such data can be used to retrain the machine learning models. The value corrected or validated by human users are given a higher confidence score while the value discarded by the users is given a lower confidence score or zero. That is, instead of calculating the confidence scores using the spatial scoring algorithm the scores are based on human labeling are used in training of machine learning models. Moreover, the data labeled by human users in this way is appended to the originally labeled data from the spatial labeling procedure to form a larger training set. The retraining of models may be triggered in the background whenever a user makes a change or a set of changes or at certain periodic intervals such as hourly, nightly, weekly, etc.

Figure 6:
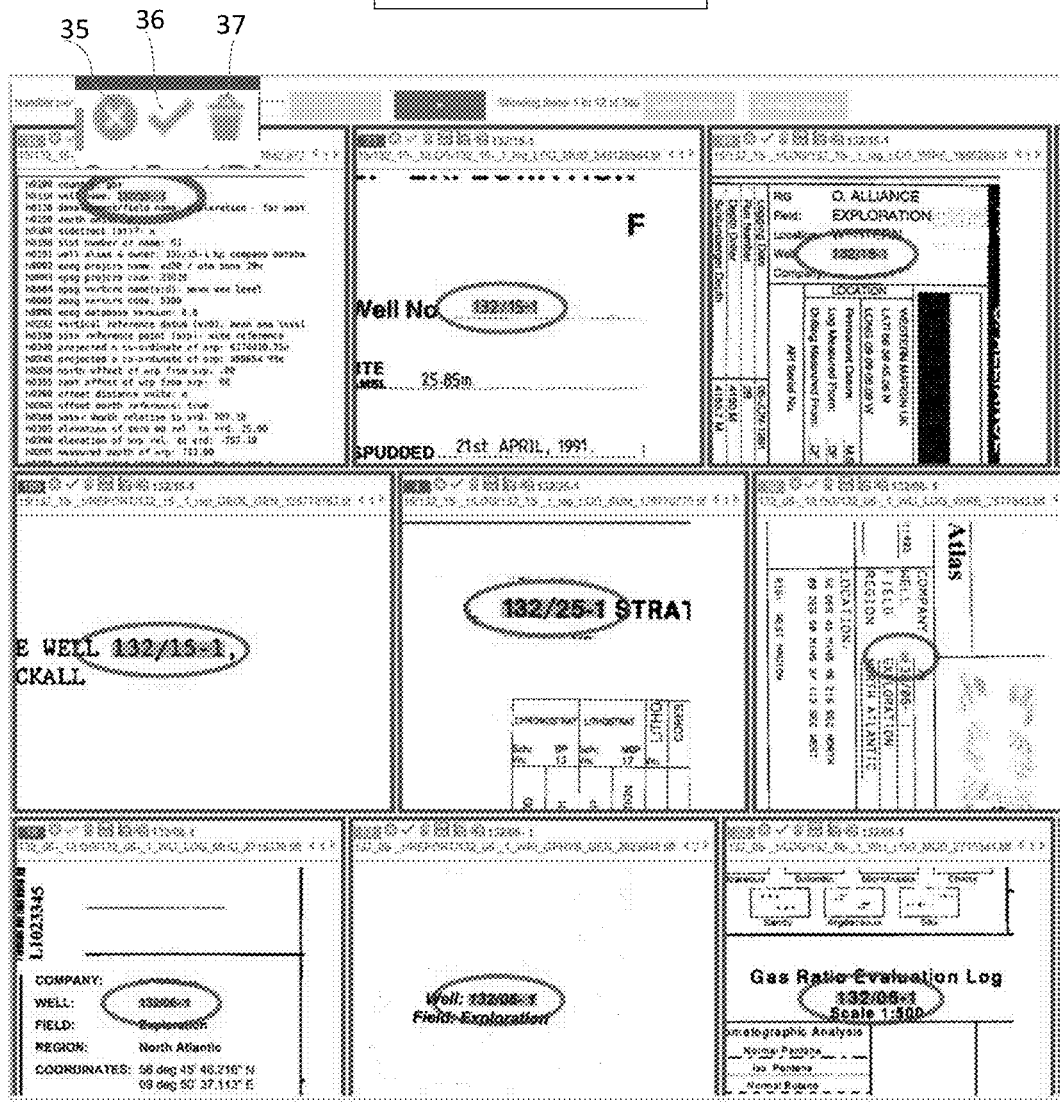
FIG. 6 shows another embodiment of the user interface where a user can view several extractions for the same attribute in the same view and then validate, rank or invalidate the different extractions.

FIG. 6. shows a list of candidates, where the user can easily visualize in their context the extracted values resulting from either the spatial scoring or the trained machine learning models, and directly improve the model by 35 Validate, 36 Invalidate, 37 Delete operations in one click on the highlighted value. With few interactions on a given attribute, this specific graphic interface approach allows the user domain expert to directly and significantly impact the model while minimizing the efforts to increase its quality.

In one embodiment of the invention the values of various attributes extracted from documents as well as the values read from an existing related database may be compared to each other and inconsistencies may be highlighted to the user. For example, a document may show a total depth of a well to be 11,000 feet, another document at 11,500 feet while an existing database may show the total depth of the same well to be 12,000 feet. The discrepancies may then be presented to the user in a user interface so that the user can take an appropriate action of either approving one of the values or by entering a new value altogether, or by updating the value in the database if the user finds that the value in the database is incorrect.

In one embodiment of the invention the benefit for the end user from the unified viewer to visualize the context of the extracted values the same way for any sort of documents regardless of their initial standard (tiff, jpeg, png, doc, pdf, etc.) or industrial formats (e.g., LAS, DLIS, SEGY, CGM, PDS in the oil and gas industry) without having to install any specific viewer. The system standardizes the page dimensions and records were the value has been extracted within the given page allowing the sourcing of the extracted values at any point in time.

The method for information extraction in the present invention may be implemented on any computer or computers including laptop and desktop computers, servers, rack servers, distributed computing systems, and handheld computers such as smartphones and tablets. The computers may be present on premise for a user, business or institution, or one or more virtual computers may be commissioned from providers of infrastructure-as-a-service or cloud providers. The user interface of the software may be exposed to the user through either a monitor connected to an on-premise computer or to remote users using a web application such that the information extraction method runs on the web server and the user interface is exposed to the user through a web browser or a dedicated application such a smartphone or a computer application.

What is claimed is:

1. A non-transitory computer program for extracting values of user defined attributes from unstructured documents, comprising:

accepting as input a set of training documents, names of attributes, and values of those attributes for each of the training documents;

accepting as input search criteria for each of the attributes;

finding candidate strings in each document that are defined as matching the search criteria;

calculating features for machine learning models by mapping the characters in rectangular windows around candidate strings to sparse feature vectors;

assigning a default machine learning label to negative candidates that are defined as matching the search criteria but not matching the supplied values for each document;

finding positive candidate values in each document defined as matching not only the search criteria but also matching the supplied values for that document;

accepting as input a set of helper text strings for each attribute from the user that are likely to occur in the spatial neighborhood of that attribute as per the domain knowledge of the user;

calculating machine learning labels for each of the positive candidate values based on the Euclidean distances of the positive candidate values to the helper strings in the document;

training the machine learning models with the calculated and assigned labels for the positive and the negative candidates, respectively, and the machine learning features computed from rectangular windows;

accepting as input a set of new documents such that the user needs the program to automatically extract the values of attributes for each document;

identifying candidates for each attribute in the new documents using the search criteria for that attribute;

calculating features from a rectangular window for each candidate in the new documents by mapping each character in the window to sparse vectors;

calculating a regression or ranking score on each of the candidates in the new documents by applying the trained models to the calculated features;

presenting the candidates in the new documents with the highest machine learning scores to the user in a graphical user interface as hypothesized extracted values for each attribute.

2. The computer program for extracting the values of attributes according to claim 1 wherein:

the documents are processed in a distributed computing system such that to process each document all the operations including optical character recognition, candidate identification, feature extraction and applying the machine learning models are carried out in separate pipeline on a processing core;

multiple documents are processed in multiple pipelines;

the hypothesized extracted values from machine learning and their locations in each document are stored in a user defined database such that the locations include page number, spatial coordinates and the instance of the value on the identified page.

3. The computer program for extracting the values of attributes according to claim 1 wherein:

the hypothesized extracted values from user supplied documents are displayed to the user in a rich graphical user interface that allows the user any of the following actions for each attribute: validate, invalidate, re-rank, relocate and supply a new value and its location in a document;

the validated and user located values are assigned a new high default score and the invalidated values are assigned a low confidence score;

the regression or ranking machine learning models are retrained by utilizing the modified scores as labels for training the machine learning models and utilizing the sparse vectors computed from rectangular windows as features.

4. The computer program for extracting the values of attributes according to claim 1 wherein:

the modified labels from user corrections and validations and the labels computed from spatial distances are combined to create a larger training set for machine learning;

the retraining of models is triggered by one of more user changes, or at certain periodic time intervals.

* * * * *